(12) United States Patent
Tu et al.

(10) Patent No.: US 6,765,375 B1
(45) Date of Patent: Jul. 20, 2004

(54) ENERGY STORAGE CIRCUITRY SYSTEM

(75) Inventors: Yu-Ta Tu, Hsinchu Hsien (TW); Show-Jong Yeh, Hemet, CA (US)

(73) Assignee: Sunyen Co., Ltd., Taipei (TW)

( * ) Notice: Subject to any disclaimer, the term of this patent is extended or adjusted under 35 U.S.C. 154(b) by 0 days.

(21) Appl. No.: 10/340,622

(22) Filed: Jan. 13, 2003

(51) Int. Cl.$^7$ ............................................. G05F 1/656
(52) U.S. Cl. ..................... 323/282; 323/222; 323/284
(58) Field of Search ................................ 323/222, 282, 323/284, 285, 286, 288

(56) References Cited

U.S. PATENT DOCUMENTS

| | | | | |
|---|---|---|---|---|
| 4,614,899 A | | 9/1986 | Webb et al. ................ | 315/411 |
| 5,422,562 A | | 6/1995 | Mammano et al. ......... | 323/282 |
| 5,568,044 A | | 10/1996 | Bittner ...................... | 323/272 |
| 5,831,394 A | | 11/1998 | Huber et al. ................ | 315/224 |
| 5,889,392 A | * | 3/1999 | Moore et al. .............. | 323/282 |
| 6,011,382 A | * | 1/2000 | Littlefield et al. ......... | 323/222 |
| 6,172,494 B1 | | 1/2001 | Feuser ....................... | 323/282 |
| 6,323,600 B1 | | 11/2001 | Statnic et al. ............. | 315/209 |
| 6,348,779 B1 | * | 2/2002 | Sluijs ........................ | 323/222 |
| 6,437,545 B2 | | 8/2002 | Sluijs ........................ | 323/222 |
| 6,456,051 B2 | | 9/2002 | Darzy ....................... | 323/284 |
| 6,566,844 B1 | * | 5/2003 | Schlicht .................... | 320/131 |
| 6,590,370 B1 | * | 7/2003 | Leach ....................... | 323/299 |

* cited by examiner

Primary Examiner—Bao Q. Vu
(74) Attorney, Agent, or Firm—Bacon & Thomas, PLLC

(57) ABSTRACT

The invention relates to an energy storage circuitry system, comprising an energy storage element, a voltage boosting circuit for storing an input voltage in the energy storage element, the voltage boosting circuit being used to regulate the input voltage by a varying switching frequency based on a feedback voltage from the energy storage element, a comparison circuit for comparing the voltage in the energy element with a reference voltage to detect if the voltage in the energy storage element achieves a predetermined value for load supplying and generate a control signal, and a charging circuit for supplying power to a load in response to the control signal when the voltage in the energy storage element is detected to achieve the predetermined value.

3 Claims, 3 Drawing Sheets

US 6,765,375 B1

ENERGY STORAGE CIRCUITRY SYSTEM

BACKGROUND OF THE INVENTION

1. Field of the Invention

The invention relates to an energy storage circuitry system and, more specifically to a circuitry system capable of accumulating electrical energy from a power source having insufficient power to meet the electrical power requirements of a load until sufficient power is stored to achieve a predetermined value for the load so as to reduce energy loss upon supply of power from a power supply system to the load. The invention permits the efficient use of relatively weak or intermittent power sources.

2. Related Technology of the Invention

Generally, when a power supply system generates electrical energy to supply to the load, the generated power is required to achieve a predetermined value. However, when the power generated by the power supply system does not achieve the predetermined value, then much of the generated electrical energy is wasted because the generated electrical energy cannot effectively supply the load.

Therefore, it is necessary to develop a circuitry system capable of allowing the small electrical energy that is generated by the power supply system and does not achieve a predetermined value, to be accumulated for release to the load upon the achievement of the predetermined value.

SUMMARY OF THE INVENTION

With a view to the above problem, an object of the invention is to provide an energy storage circuitry system capable of accumulating a small electric energy until sufficient energy has been stored to supply to the load efficiently. Thus, the energy loss of the power supply system to the load can be reduced.

For achieving the above object, according to one aspect of the invention, an energy storage circuitry system is provided, comprising an energy storage element for accumulating small amounts of electrical energy from the power supply system, a voltage boosting circuit for regulating a switching frequency of the storage element input based on a feedback voltage from the energy storage element to control input of energy to the energy storage element, a comparison circuit for comparing the voltage in the energy storage element with a reference voltage to detect if the voltage in the energy storage element has achieved a predetermined value sufficient to efficiently supply the load and generate a control signal upon detection that the predetermined value has been reached, and a charging circuit for supplying power to the load in response to the control signal when the voltage in the energy storage element is detected to achieve the predetermined value.

Further, according to a preferred embodiment, the voltage boosting circuit regulates the switching frequency of the input from the power supply in a PFM (pulse frequency modulation) manner.

Thus, the present invention can obtain the following effects:

1. accumulating a small amount of electrical energy until a predetermined value to meet the requirement of a load is achieved; and
2. reducing the energy loss of the power supply system.

DESCRIPTION OF THE INVENTION

Figure 1:
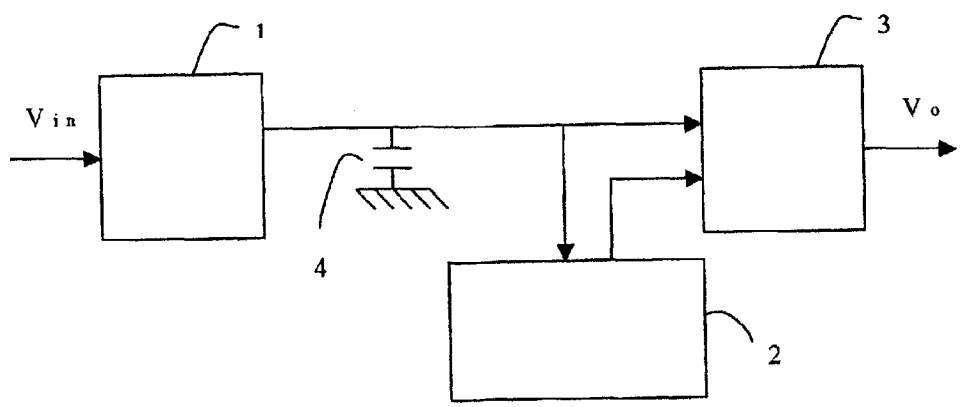
FIG. 1 is a block diagram showing a schematic structure of a energy storage circuitry system in accordance with the invention.

FIG. 1 is a block diagram of a schematic structure of an energy storage circuitry system in accordance with the invention. The energy storage system comprises a voltage boosting circuit 1, a comparison circuit 2, a charging circuit 3, and an energy storage element 4. The voltage boosting circuit 1 is used for regulating a switching frequency of an input voltage $V_{in}$ from a power supply system and for storing the input voltage in the energy storage element 4. It will be appreciated that the energy storage element 4 is not restricted to the capacitor shown in the drawing and can be any energy storage element such as a battery or the like. The comparison circuit 2 is used for comparing the voltage in the energy storage element with a reference voltage and releasing the energy when a predetermined voltage is detected in the energy storage element 4. When the voltage achieves the predetermined voltage, the comparison circuit 2 may generate a control signal to control the energy release to the load. As soon as energy is released, the comparison circuit 2 will simultaneously return to a state for detecting the energy storage. The charging circuit 3 is used for supplying for the load in response to the control signal as soon as the voltage in the energy storage element 4 is detected to achieve the predetermined voltage value.

Figure 2:
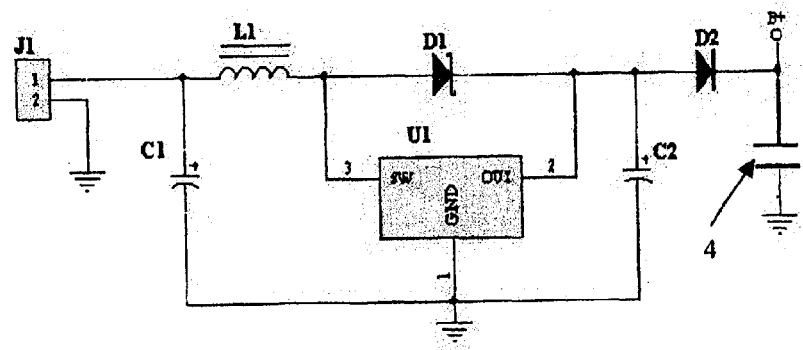
FIG. 2 is a schematic drawing showing a schematic structure of a voltage boosting circuit in accordance with the invention.
Figure 3:
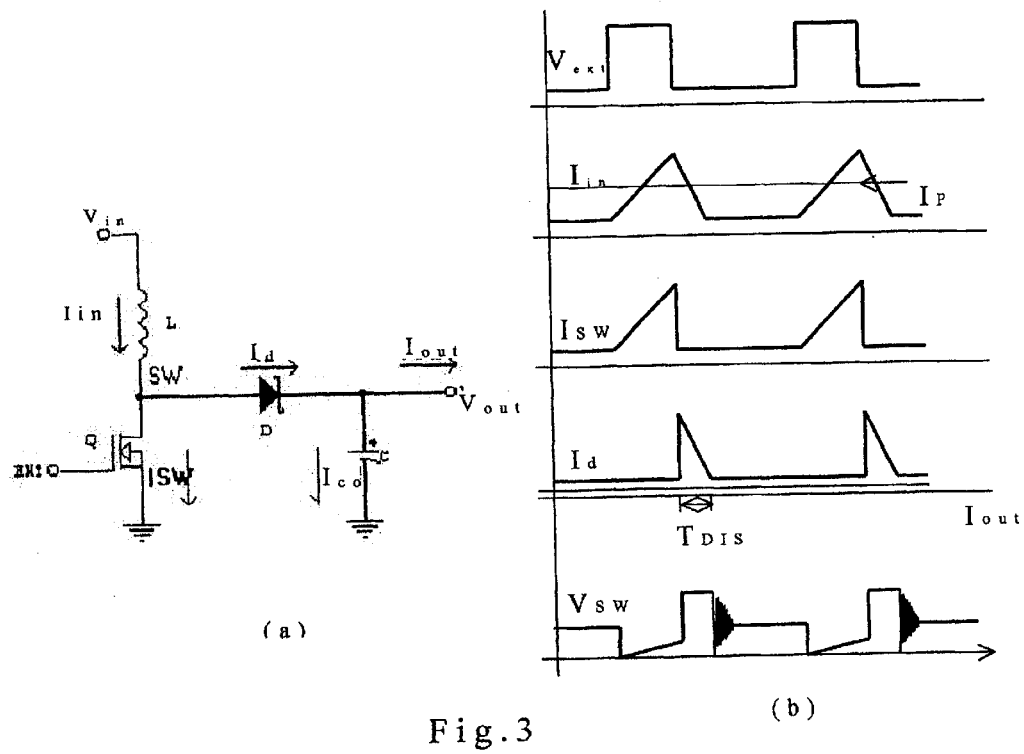
FIGS. 3(a) and 3(b) are schematic drawing showing an equivalent circuit and waveform of the voltage booting circuit of FIG. 2.

FIG. 2 shows a schematically structural diagram of the voltage boosting circuit 1 in accordance with the invention, and FIGS. 3(a) and 3(b) shows an equivalent circuit and waveform for the voltage boosting circuit 1 of FIG. 2.

U1 shown in FIG. 2 is a PFM (pulse-frequency modulation) controlled IC for regulating and stabilizing voltage supplied to the storage element 4. As shown in FIG. 3(a) IC $U_1$ employs a voltage controlled oscillation (VCO) circuit to drive an N-channel MOSFET to compare the voltage in the energy storage element with an internal reference voltage for regulating the switching frequency of the MOSFET. This causes the MOSFET to output frequency modulation pulses to stabilize the output voltage. The N-channel MOSFET can be driven by a small voltage and current and may achieve a higher efficiency in the switching circuit for boosting voltage to obtain a stable output voltage. When power is supplied, the PFM generates an oscillating frequency at SW as follows: when the MOSFET turns on, the input current $I_{in}$ energizes an inductor L ($L_1$ in FIG. 2) and stores the energy in the inductor L. When the MOSFET turns off. The energy in the inductor L will release and generate current $I_d$ to accompany a discharge current of a capacitor ($C_2$ in FIG. 2) to charge the energy storage element 4 for providing to a load. Thus, the switching frequency is a key factor for determining the output voltage. Therefore, when the input $V_{in}$ is connected to the power supply system, if the supplied voltage is higher that the predetermined voltage for U1, the internal feedback circuit will compare the voltage of the energy element 4 with the predetermined voltage. If the voltage of the energy storage element 4 is lower than the preset reference voltage, this indicates that the output voltage of the energy storage element has not achieved a predetermined voltage. Based on the switching frequency, the comparator ($U_2A$ in FIG. 4) will generate a control signal which controls whether to raise the voltage in the energy storage element. Due to the lower internal resistance, when the circuit 1 is used to charge the energy storage element 4, the switching frequency will be the highest oscillating frequency.

Figure 4:
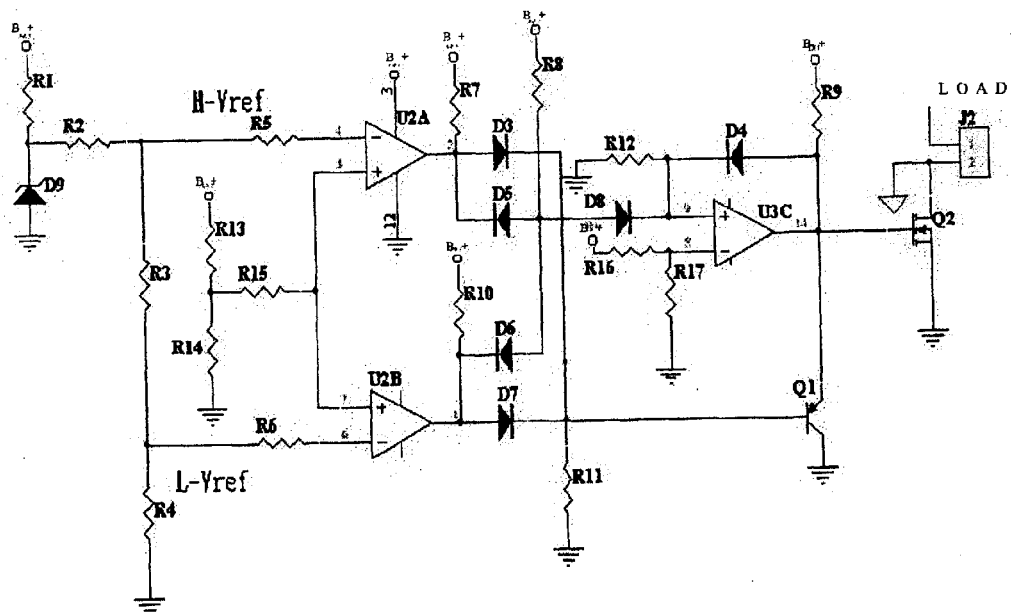
FIG. 4 is a schematic diagram showing a control circuit in accordance with the invention.

FIG. 4 shows a schematic structural diagram for the control circuit 2 in accordance with the invention. The control circuit 2 mainly detects whether the stored energy can be released to supply the load, and builds up a voltage of the stored energy on a resistor R1 and a diode D9 to provide a stable voltage source. The resistors R2, R3, R4 divide the input into two different reference voltages, which are respectively supplied to the negative input terminals of comparators U2A and U2B. The resistors R13, R14 also provide a predetermined voltage value. Diodes D3, D7 form an OR gate and diodes D5, D6 form an AND gate. The function of the AND gate is to judge if the stored voltage in the energy storage is higher than the two reference voltages. When the stored voltage is higher than H-$V_{ref}$, the AND gate turns MOSFET Q2 on. When the outputs of U2A, U2B are lower than H-$V_{ref}$, the gate turns Q1 on such that the output of U3C is changed to a low voltage because the collector and emitter of Q1 are grounded. At this time, MOSFET Q2 turns off to stop charging the rechargeable product.

Figure 5:
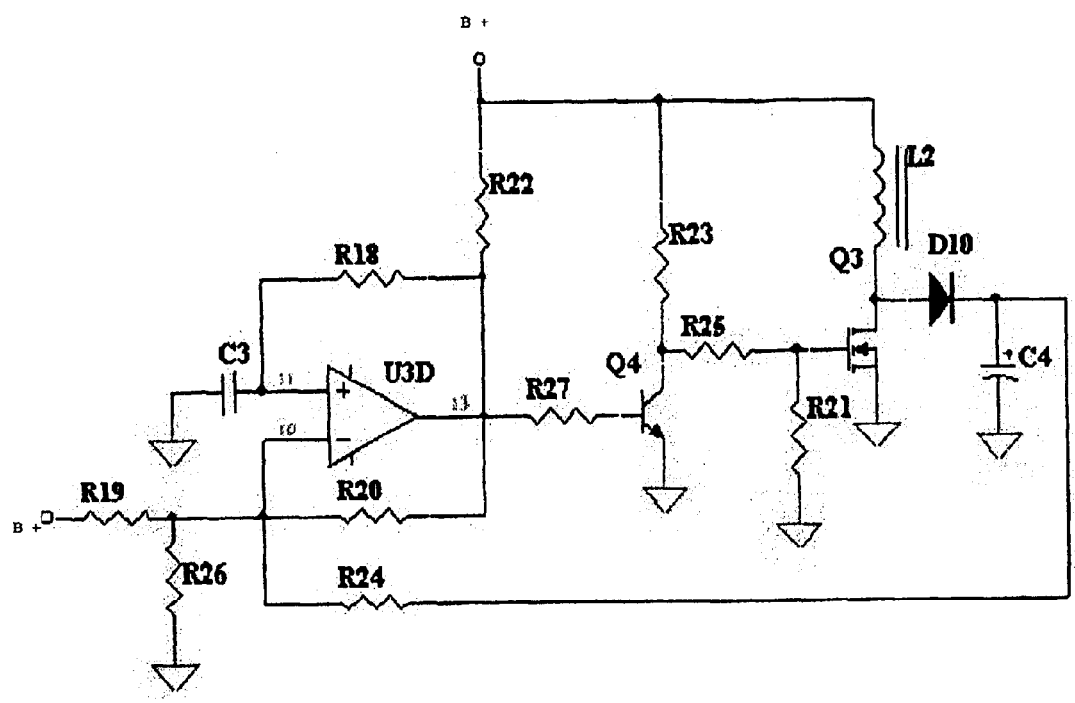
FIG. 5 is a schematic diagram showing a schematic structure of a charging circuit in accordance with the invention.

FIG. 5 shows a schematic structural diagram of the charging circuit 3 in accordance with the invention. The operation of the charging circuit 3 is generally the same as that of the voltage boosting circuit 1. That is to say, the charging circuit 3 acts as a further voltage boosting converter which utilizes IC U3D to form an oscillator to cause MOSFET Q3 to turn on through the amplification of the transistor Q4. When MOSFET Q3 turns on, current flows through the inductor L2 to ground and the inductor L2 can store the energy. When MOSFET Q3 turns off, the inductor L2 releases the energy through diode D10 to charge the output capacitor C4 for the load. Diode D10 supplies a feedback signal to the input of IC $U_3D$ through resistor R24 to control the stabilization of the output voltage.

Summing up the foregoing, the invention can effectively realize the following targets:

1. increasing the present energy storage efficiency.
2. decreasing the circuit size of the energy storage circuit.

By way of example, the circuit of the invention may be applied to a generator system that generates energy in response to intermittent vibrations or motion, providing a stable output no matter how irregular the vibrations or motion that causes generating of power.

Having described a preferred exemplary example of the invention, however, it will be appreciated that the example is not intended to be the limit of the invention. It is noted that modifications and variations can be made by persons skilled in the art in light of the above teachings. It is therefore to be understood that various changes, equivalences and modifications may be made in the particular example of the invention without departing from the scope and spirit of the invention as outlined by the appended claims.

List of Reference Numerals 1. voltage boosting circuit
2. control circuit
3. charging circuit
4. energy storage element

What is claimed is:

1. An energy storage circuit system, comprising: an energy storage element; a voltage boosting circuit for receiving an input voltage and storing the input voltage in the energy storage element; a control circuit for comparing the voltage in the energy storage element with a reference voltage to detect if the voltage in the energy storage element has reached a predetermined value and for generating a control signal based on the detected voltage; and a charging circuit, for:

a. preventing voltage in said energy storage element from being supplied to a load when the voltage in said energy storage element is less then said predetermined value, and b. supplying the voltage stored in said energy storage element to the load when the control signal indicates that the voltage in the energy storage element has reached the predetermined value, whereby input voltages having less than said predetermined value are accumulated in said energy storage element and only released to the load when the stored voltage has reached said predetermined value.

2. The energy storage element according to claim 1, wherein the voltage boosting circuit is used to regulate the input voltage by varying a switching frequency based on a feedback voltage from the energy storage element.

3. The energy storage element according to claim 2, wherein the voltage boosting circuit regulates the switching frequency of the input voltage in a PFM (pulse frequency modulation) manner by using the control signal.

* * * * *